Oct. 16, 1962  W. RUDSZINAT  3,058,568
DEVICE FOR TRANSFERRING ROD-SHAPED ARTICLES
Filed April 12, 1960

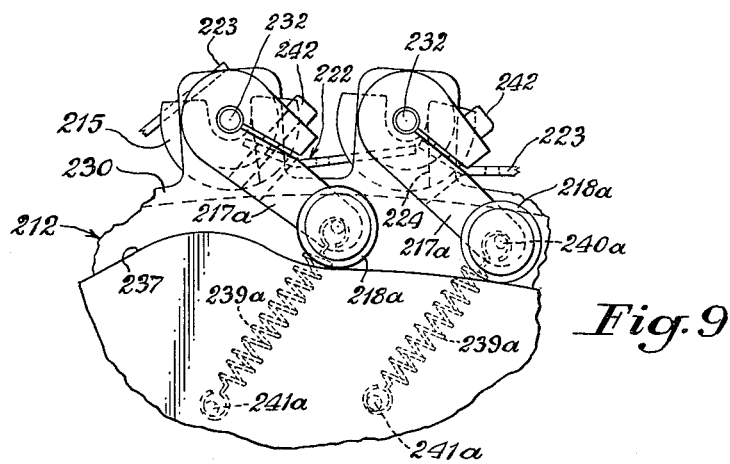
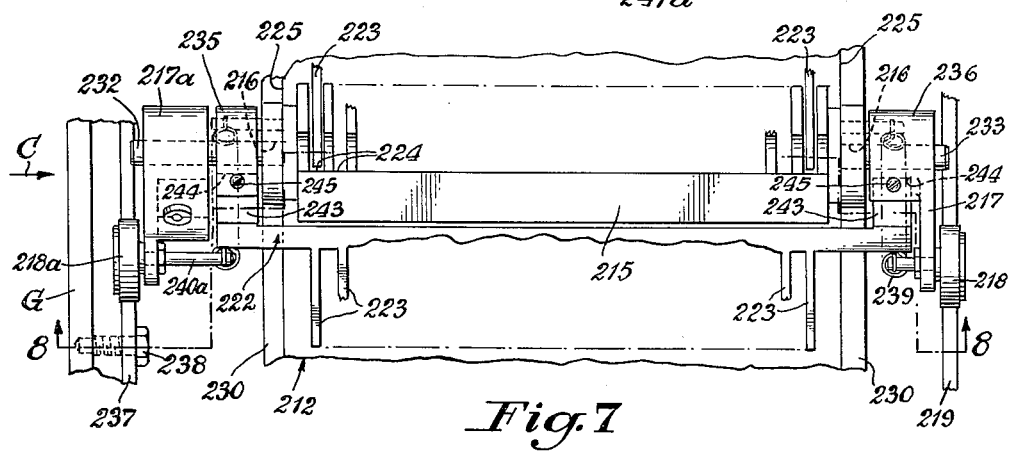
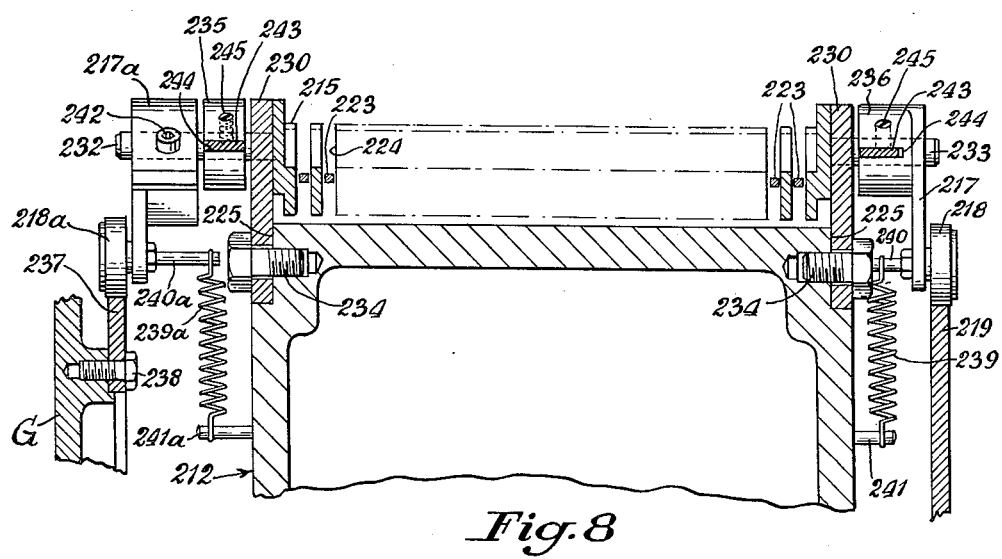

United States Patent Office 3,058,568
Patented Oct. 16, 1962

3,058,568
DEVICE FOR TRANSFERRING ROD-SHAPED ARTICLES
Willy Rudszinat, Hamburg-Lohbrugge, Germany, assignor to Hauni-Werke Korber & Co., K.G., Hamburg-Bergedorf, Germany
Filed Apr. 12, 1960, Ser. No. 21,756
Claims priority, application Germany Apr. 13, 1959
6 Claims. (Cl. 198—25)

The invention relates to cigarette making machines and particularly to a device for transferring rod-like articles, for instance cigarettes and filter mouthpieces, from one conveyor means to another conveyor means.

When connecting groups of articles, such as axially aligned cigarettes and filter mouthpieces or filter plugs, by means of a connector band, the groups of axially aligned articles are transferred together with a connecting band attached to them from a rotary transfer drum provided with axially extending grooves in its periphery to a similarly grooved receiving drum and then are retained in the grooves of the latter.

In order to prevent any displacement of the connecting bands adhering to the groups, which bands are to be wrapped around the groups, the invention provides that the grooves of the transfer drum are associated with movable projecting holders, the projecting ends of which are adapted to be pressed, during the transfer of a group of articles into the corresponding grooves of the receiving drum or bar-shaped grooved bodies fixedly mounted on the receiving drum, against the connecting band concerned and then are removed from the connecting band or from the group after the insertion of the group and thereafter are adapted to return to their starting positions. Thereby any displacement of the groups or of the connecting band relatively to the groups is prevented during the transfer from the transfer drum to the receiving drum.

The ability to control the holders can be secured by the fact that they are pivotally mounted adjacent stationary grooved bodies of the receiving drum. Provision may, however, also be made that the control of these holders is effected by a rocking movement of the grooved bodies themselves. Finally, it is also possible that both the grooved bodies and also the holders are independently supported and independently controlled. In each case the holders can serve for ejecting the finished wrapped groups of articles after wrapping the connecting band around the groups, at another point of the path of movement of the receiving drum.

Figure 1:
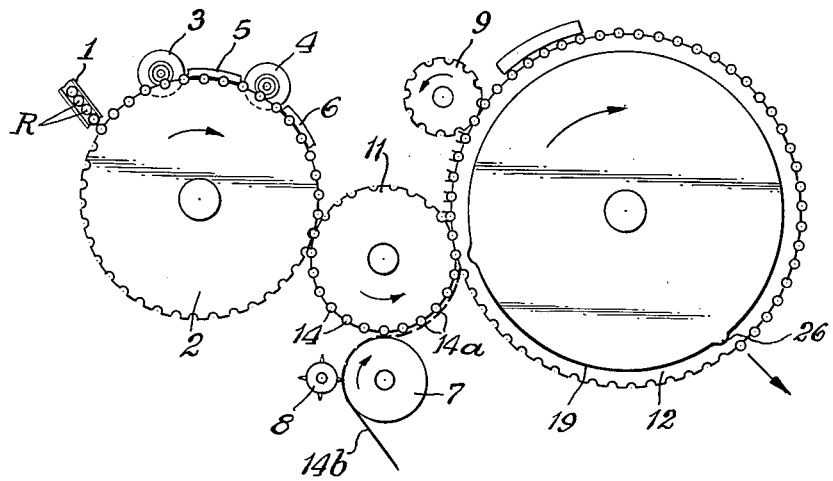
Figure 2:
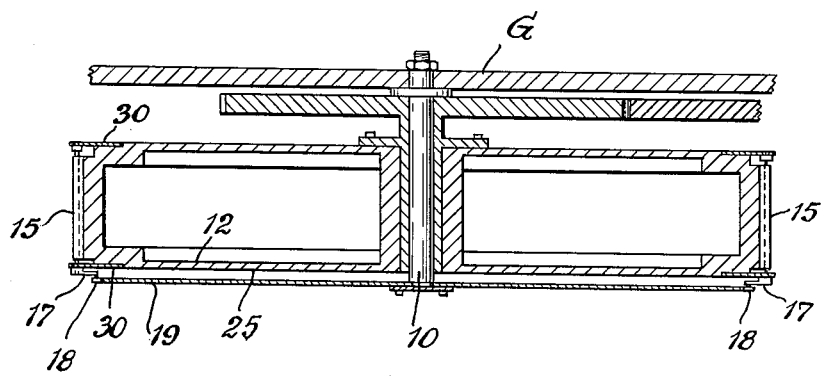
Figure 3:
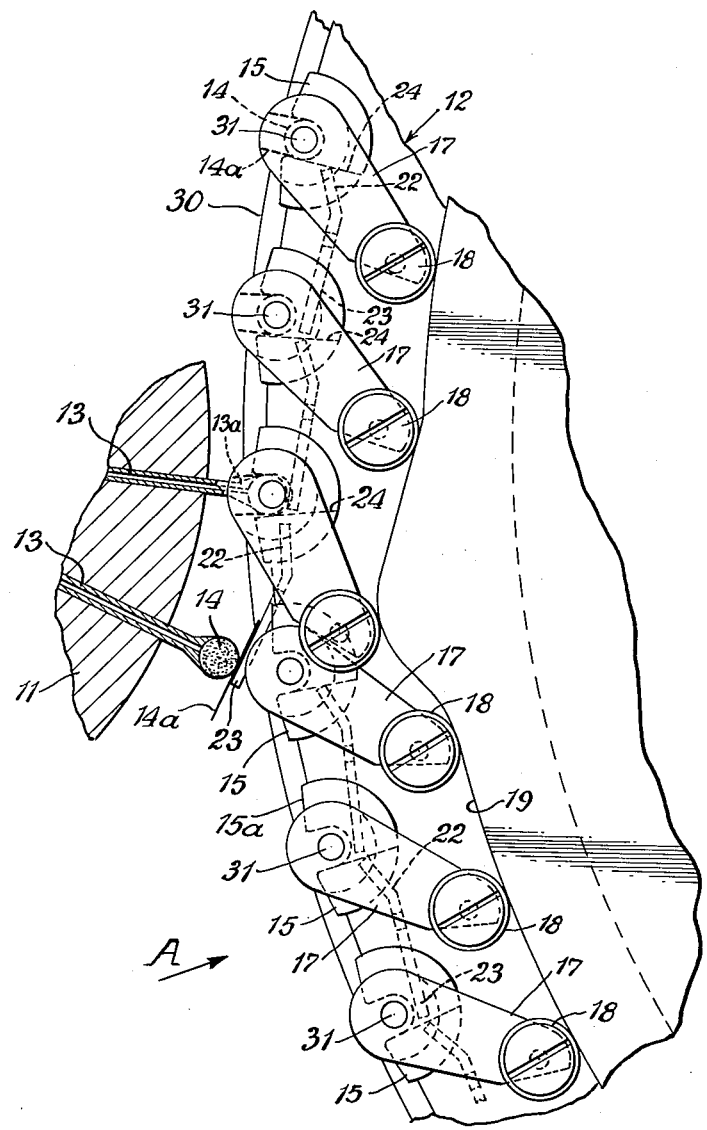
Figure 6:
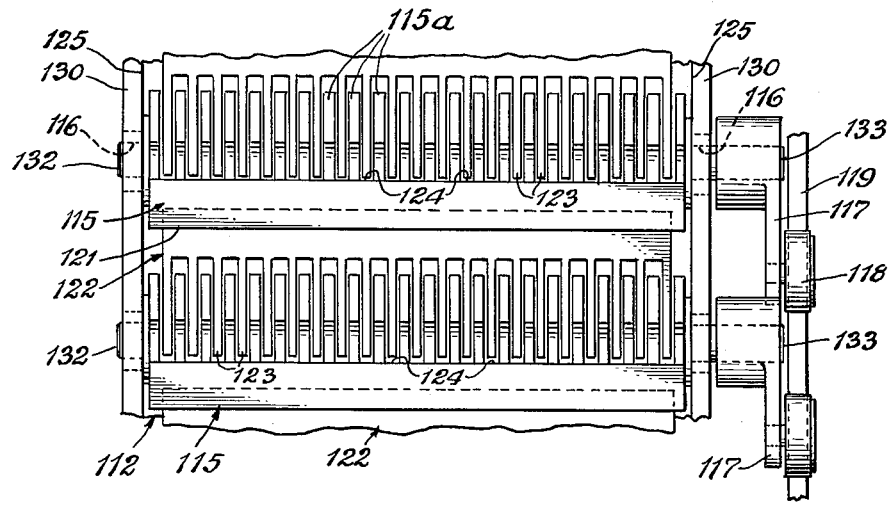
Figure 4:
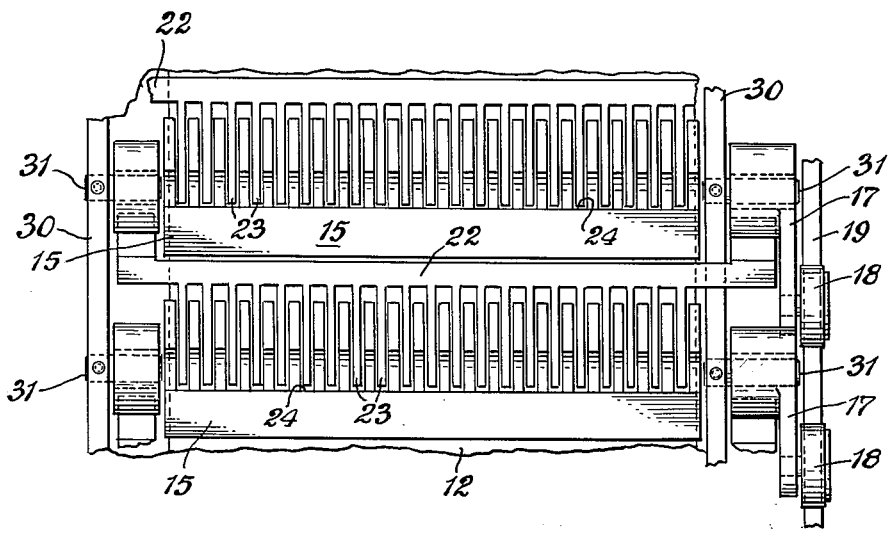
Figure 5:
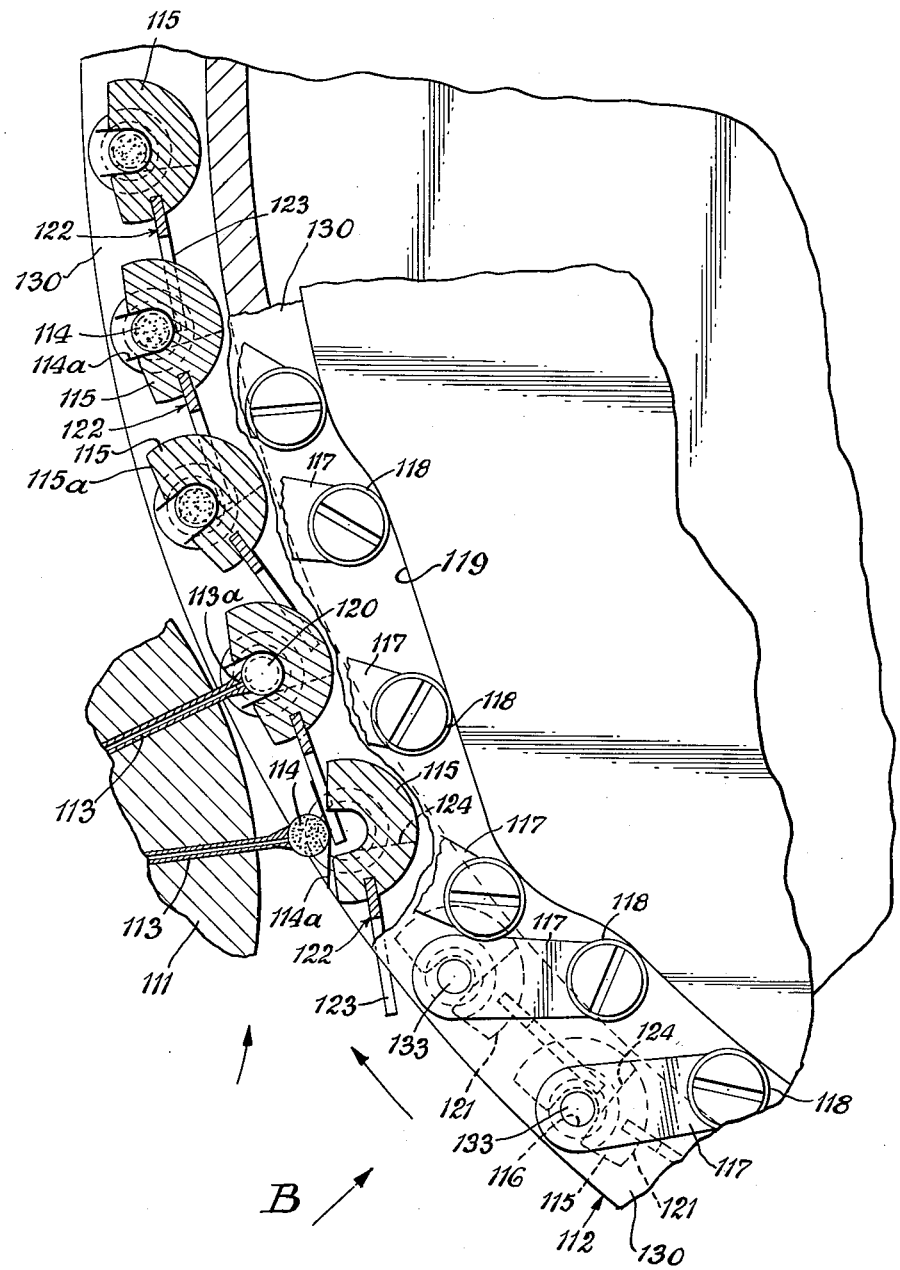

The device of the invention is shown diagrammatically on the accompanying drawings, wherein:

FIG. 1 is a diagrammatic end view of a recess filter making machine,

FIG. 2 is a diametric cross-section through the receiving drum on an enlarged scale, FIG. 3 is a partial side view of the transfer drum and the receiving drum on a still larger scale wherein the holders are controllable and the grooved bodies are fixedly attached with the receiving drum, FIG. 4 is a plan view of the receiving drum in the direction of the arrow A in FIG. 3, FIG. 5 is a partial side view of the two drums wherein the holders are fastened to the grooved bodies and are arranged rotatably on the periphery of the receiving drum, FIG. 6 is a partial plan view of the receiving drum in the direction of the arrow B in FIG. 5, FIG. 7 shows another embodiment of the invention, namely a partial plan view of a receiving drum provided with independently rotatable grooved bodies for the reception of rod-shaped articles and rotatably mounted holder elements, FIG. 8 is a sectional view along the line 8—8 of FIG. 7, and FIG. 9 is a partial side view of the receiving drum when viewed in the direction of the arrow C in FIG. 7.

The parts of the device shown in FIG. 1 are typical of the machine to which the present invention is applicable, and relate to the path of movement of filter rods, in a machine for producing recess filter rods. The parts shown illustrate a discharge duct 1 of a magazine, not shown, a magazine drum 2 with rotary cutting discs 3 and 4 for the filter rods R and guide rails 5 and 6 for axially moving the cut filter rod parts apart. The magazine drum 2 discharges the cut filter rods onto a transfer drum 11 provided with suction operated holder members 13 (FIG. 3) for initially retaining the groups of articles 14 consisting of filter rod parts until they are transferred to the receiving drum 12. A suction roller 7 is arranged beneath the transfer drum 11. This suction roller 7 cooperates with a cutter drum 8 which cuts gummed connecting bands 14a from a continuous strip 14b fed toward the suction roller 7. A grooved drum 9 cooperating with the receiving drum 12 is arranged after the transfer point.

The construction of the receiving drum 12 is shown in FIG. 2. The drum 12 consists of bar-shaped bodies 15 provided each with a longitudinal groove to receive the articles from the transfer drum 11. The body of the receiving drum 12 is rotatably supported on a horizontal shaft 10 fixedly mounted in the machine frame G and the bar-shaped bodies 15 are fixedly attached on the circumference of the drum body. Mounting rings 30 on the end faces of the drum body (see also FIG. 4) carry bearing pins 31 which pivotally support one end of levers 17, to which end plate-like holders 22 are fastened so as to extend over the length of the bodies 15.

The other ends of the levers 17, remote from the holders 22 and located in the region of the end wall 25 of the drum 12 (see FIG. 2), have rollers 18 attached thereto (FIGS. 3 and 4) which are engaged by a cam 19 fixedly attached to the stationary shaft 10 of the drum 12. The levers 17 are thereby controlled in such manner that a holder 22 with the series of finger-like portions 23 thereon (FIG. 4) is able to engage so far into transverse recesses 24 provided in the bar-shaped bodies 15 so that the groups of articles 14 to be transferred can be inserted into the groove of the next following bar-shaped body 15, whereupon the respective holder 22 with its fingers 23 is removed from the group of articles inserted in the next following groove. For delivering the groups of articles 14 the came 19 is provided, as shown in FIG. 1, with a projecting portion 26 which causes the holders 22 to move outwardly to a certain extent from within the recesses 24 for pressing out the finished rods from the bodies 15 at another point of the path of movement.

The device described operates as follows:

The filter rods R delivered to the clockwise rotating drum 2 are cut by the rotary circular cutters 3 and moved axially apart by the guide rails 5. The cut filter rods are cut again by two further cutters 4 into filter plugs. The filter plugs are axially moved apart the required distance by means of further guide rails 6. The groups of filter plugs 14 so formed are delivered by the rotating drum 2 to the transfer drum 11 which rotates anti-clockwise. At the lower portion of this drum 11 a connecting band 14a is attached to the circumference of each group, which band was just previously cut from a continuous gummed connecting strip 14b on the suction roller 7 by means of the rotating cutter drum 8.

When the groups 14 with the connecting bands 14a thereon approach the transfer drum 12 the fingers 23 on the holders 22 are rocked towards the groups 14 so that their engagement surfaces lie approximately at the level of the connecting bands 14a. This relative position between the groups 14 and the bands 14a and fingers 23 is maintained until the groups have been transferred into the grooves of the bodies 15 of the receiving drum 12. By such a holding of the groups 14 the transfer into the grooves on the bodies 15 is performed while maintaining the relative position between the groups 14 and the connecting bands 14a. The ends of the now U-shaped folded connecting bands 14a are then completely wrapped around the groups 14 by any well known mechanism.

In the embodiment of the invention according to FIG. 5 the transfer drum 111 includes holder elements 113 and intermediate members 120 which occupy the space between the axially spaced filter rod parts.

The grooved bar-shaped bodies 115 of the receiving drum 112 are pivotally mounted on the periphery of the drum 112 by means of bearings 116. The ends of the bodies 115 have transversely extending arms 117 attached thereto, the free ends of which carry rollers 118 engaged by a cam 119 fixedly secured to the stationary shaft of the receiving drum 112. The bodies 115 are rocked in their bearing 116 by the cam 119 in such manner that they are positioned opposite the holder elements 113 of the transfer drum 111 ready to receive the groups 114 over a suitable portion of the path of the receiving drum 112.

At the lengthwise extending trailing edge 121 of each body 115 is attached a holder in the form of a strip 122 having transversely extending spaced fingers 123 substantially along the whole length of the body 115. The fingers 123 are adapted to engage transverse recesses 124 provided in the next following body 115 to such an extent that the group 114 to be transferred can be guided smoothly into the groove of the next following body 115 whereupon the strip 122 with the fingers 123 is again removed from the group 114 inserted into the next following body 115.

The fingers 123 are moved somewhat out of the recesses 124 again at another point of the path of movement, for which purpose the cam 119 has an appropriate form so that the finished groups are ejected from the grooves 115.

The operation of this recess filter making device is as follows:

The suction operated holder elements 113 hold the groups 114 firmly at their widened outer ends 113a. The grooved bodies 115 pertaining to the elements 113 are already aligned with the groups 114 held by the elements 113 during their approach in such manner that they are in the most favorable position for transfer without unilateral engagement against the grooved bodies 115. This is obtained by the fact that simultaneously with the approach of an element 113 to its respective grooved body 115 the holder 122 secured to the preceding body 115 is actuated to press by its fingers 123 laterally against the connecting band 114a of the group 114 to be transferred and thereafter is moved pivotally so that the support of the groups is maintained until transfer into the grooved bodies 115 is substantially effected. In this way during the transfer of the groups 114 the grooved bodies 115 of the receiving drum 112 are positioned radially to the respective element 113 of the transfer drum 111. On further relative movement of the drum 111 of the element 113 the grooved body rotates correspondingly until it reaches the basic position in which the ends of the connecting band are folded in the usual manner by means of folder elements.

The leading edges 115a of the grooved bodies 115 are chamfered so that a free entry of the connecting band into the cooperating region of the two drums or the grooves thereof is obtained.

The finally positioned groups are ejected at another point of the path of movement of the receiving drum 112 by swinging the fingers 123 out of the grooved bodies 115 and the groups are then transferred to a further conveyor.

As shown in FIG. 6, the bearings 116 have journaled therein the bearing pins 132, 133 formed at the ends of the bar-shaped grooved bodies 115. The bearings 116 themselves are formed in annular ring plates 130 attached to the end faces 125 of the drum 112. The bearing pin 133 has fixedly attached thereto the lever arm 117, the other free end of which carries the cam engaging roller 118.

The FIGS. 7 and 8 illustrate an embodiment of the invention in which the receiving drum 212 is provided with independently rotatable grooved bodies 215 and holding member 222. The two bearing pins 232 and 233 at the ends of the bar-shaped grooved bodies 215 are rotatably supported in bearings 216 provided in annular rings 230 which are attached by screws 234 to the end faces 225 of the drum 212. On a portion of the bearing pin 232 is rotatably mounted a collar 235 which has fixedly attached thereto one end of the bar-shaped holding member 222. On a portion of the other bearing pin 233 is rotatably mounted the lever 217. The lever 217 has a hub 236 which has secured thereto the other end of the holding member 222. The holding member 222 engages with its fingers 223 the recesses 224 provided in the next following grooved body 15. The roller 218 at the free end of the lever 217 engages the cam 219.

A link 217a is attached to the end of the bearing pin 232 and carries at its other free end a roller 218a which engages a cam 237 which by screws 238 is fixedly attached to the frame G of the machine.

It will be noted that according to FIG. 9 the link 217a has a slotted hub and that the slot is traversed by a screw 242 which permits a clamping of the link 217a to the bearing pin 232 in the desired position. The other levers may be attached in similar manner to their supporting or bearing pins.

FIG. 9 illustrates also that the rollers 218 and 218a are urged yieldably in engagement with the cams 219 and 237 respectively, by springs 239 and 239a respectively, for which purpose one end of these springs is attached to pins 241 and 241a respectively, while the other end of these springs is attached to the bearing pins 240 and 240a of the rollers 218 and 218a respectively.

According to the FIGS. 7 and 8, the mounting of the plate-like holding member 222 on the hubs 235 and 236 is effected by somewhat angularly offset legs 243 which are inserted into substantially radial slots 244 and are secured in these slots by screws 245.

What I claim is:

1. In a device for transferring rod-shaped articles, such as axially spaced cigarettes, filter mouthpieces or filter plugs having a flat connecting band attached to their circumference, from a transfer drum provided with a series of articles supporting members on its periphery to a series of cooperating article supporting members on the receiving drum, the improvement comprising pivotally mounted plate-like holders arranged to extend axially along the periphery of the receiving drum, said holders having transversely extending projections adapted to contactually engage and support the connecting band on said rod-shaped articles during the transfer of the same to the article supporting members on the receiving drum, said holders and the projections thereon being movable away from the connecting bands and from the articles themselves after the same have been transferred and deposited on the article supporting members on the receiving drum, and means for controlling the movement of said holders in dependence of the relative movement of said receiving drum.

2. Device according to claim 1, in which said pivotally mounted holders have cam controlled levers attached thereto.

3. A device according to claim 1, in which said article supporting members on said receiving drum include bar-shaped bodies extending axially of said receiving drum and provided with grooves for receiving the rod-shaped articles from said transfer drum, and means for rotatably supporting said bodies on said receiving drum.

4. In a device for transferring rod-shaped articles, such as axially spaced cigarettes, filter mouthpieces and filter plugs having a flat connecting band attached to their circumference, from a transfer drum provided with a series of grooved supporting members on its periphery to a series of grooved supporting members on said receiving drum, the improvement comprising pivotally mounted plate-like holders arranged to extend axially along the periphery of the receiving drum, said holders having transversely extending projections adapted to contactually engage and support the connecting band on said rod-shaped articles during the transfer of the same to the grooves on the supporting members of the receiving drum, said holders and the projections thereon being movable in a direction away from the connecting bands and from the articles themselves after the same have been transferred and deposited in the grooves of the supporting members on said receiving drum, and means for controlling the movement of said holders in dependence of the relative movement of said receiving drum, said transversely extending projections consisting of laterally spaced fingers adapted to enter into recesses formed in the supporting members of said receiving drum.

5. In a device for transferring rod-shaped articles such as axially spaced cigarettes and filter mouthpiece plugs having a flat connecting band attached to their circumference from a transfer drum to a receiving drum said transfer and receiving drums being provided with a series of cooperating grooved supporting members, a series of pivotally mounted plate-like holders circumferentially spaced around the periphery of the receiving drum and arranged to extend axially thereof, said plate-like holders being provided with transversely extending projections adapted to cooperate with the grooves of an adjacent supporting members on the receiving drum to engage and support the connecting band on the rod-shaped articles during the transfer of the same from the grooves the supporting member on the transfer drum to the grooves of the supporting member on the receiving drum, said holders being pivoted so that their projections will engage and support the connecting bands and move in a direction from the transfer drum toward the receiving drum after the rod-shaped articles and connecting bands have been deposited in the grooves of the supporting members on said receiving drum, and cam means for controlling the movement of said holders during rotation of said receiving drum.

6. In a device for transferring rod-shaped articles such as filter mouthpiece plugs and the like having a flat connecting band attached to their circumference from a transfer drum having supporting members provided with article receiving grooves to a receiving drum, comprising bar-shaped members rockably mounted on said receiving drum having grooves to receive said rod-shaped articles from said transfer drum, said bar-shaped members being circumferentially arranged in spaced relation on said receiving drum and arranged to receive a rod-shaped article in the groove thereof from the grooved supporting member of said transfer drum, a control arm connected to each of said rockably mounted bar-shaped members, and cam means positioned to engage the free end of each of said arms during rotation of said receiving drum to position the bar-shaped members and the grooves therein in true alignment with the article supporting members on said transfer drum when the same approach said transfer point.

References Cited in the file of this patent
UNITED STATES PATENTS 2,609,946    Brager et al. _____ Sept. 9, 1952
2,809,639    Edwards _____ Oct. 15, 1957